United States Patent [19]

Lombard et al.

[11] 4,068,631
[45] Jan. 17, 1978

[54] INTERNAL COMBUSTION ENGINE ELECTRONIC IGNITION CONTROL SYSTEM

[75] Inventors: Claude Lombard; Claude Leichle, both of Boulogne-Billancourt, France

[73] Assignees: Regie Nationale des Usines Renault, Boulogne-Billancourt; Automobiles Peugeot, Paris, both of France

[21] Appl. No.: 674,456

[22] Filed: Apr. 9, 1976

[30] Foreign Application Priority Data

Apr. 10, 1975 France .................................. 75 11175

[51] Int. Cl.² ................................................ F02P 5/04
[52] U.S. Cl. .............................. 123/117 D; 123/32 EC
[58] Field of Search .......... 123/117 D, 117 R, 32 EB, 123/32 EC

[56] References Cited

U.S. PATENT DOCUMENTS

| | | | |
|---|---|---|---|
| 3,831,563 | 8/1974 | Brittain | 123/117 D |
| 3,908,616 | 9/1975 | Sasayama | 123/117 D |
| 3,921,610 | 11/1975 | Hartig | 123/117 D |
| 3,927,648 | 12/1975 | Kawai | 123/117 D |
| 3,934,563 | 1/1976 | Muller | 123/117 D |
| 3,942,491 | 3/1976 | Seite | 123/117 D |
| 3,946,709 | 3/1976 | Monpetit | 123/117 D |

Primary Examiner—Ronald B. Cox
Attorney, Agent, or Firm—Fleit & Jacobson

[57] ABSTRACT

An electronic ignition control system for internal combustion engine, notably for motor vehicles, which comprises a rotary member revolving at the engine velocity and provided with at least two reference marks of which the positions correspond to the maximum ignition advance angle and to the minimum ignition advance angle, respectively, said reference marks defining at least one area on said rotary member, a sensor disposed in close vicinity of said rotary member so as to detect the moments of passage of said reference marks and at least one up-and-down counter for counting pulses, said rotary member further comprising a third reference mark separate from the first two reference marks aforesaid so as to define two successive areas (A = 12, 13; B = 13, 14) scanned in succession by said sensor, while a first up-and-down counter positively counts the pulses from a first clock system during the passage of said first area (A) and negatively counts, during the passage of the second area (B), the pulses from a second clock system adapted to emit pulses at a frequency programmable according to the desired ignition advance law, the resetting of said up-and-down counter being utilized for producing the ignition spark.

6 Claims, 9 Drawing Figures

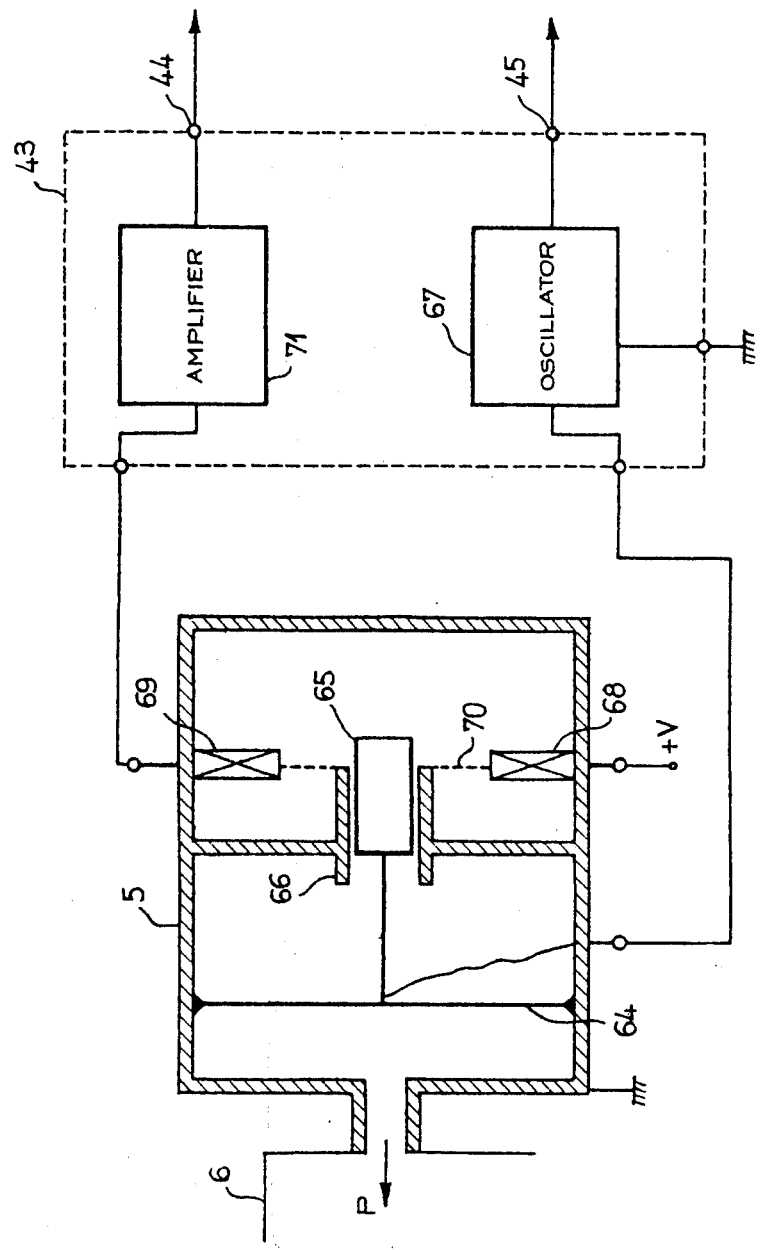

INTERNAL COMBUSTION ENGINE ELECTRONIC IGNITION CONTROL SYSTEM

The present invention relates generally to electronic means for controlling the ignition of internal combustion engines, notably of motor vehicles.

The primary requirement in the control of an internal combustion engine is the possibility of generating ignition pulses shifted in relation to the top dead center of the piston by a magnitude to be determined and which must be independent of the rotational cycle of the engine itself.

Devices of this character are already known, such as devices operating according to the principle of inertia or centrifugal weights, vacuum chamber and switching contacts. The chief inconvenience of devices of this known type is the necessity of frequently adjusting them in order to obtain satisfactory engine performances.

Another known device referred to as a fully electronic one is based on the electronic calculation of the ignition advance angle and the detection of series of pulses along the outer periphery of the engine flywheel in order to determine their positions. These devices involve the use of a complex computer and the relatively great number of reference marks to be provided on the engine flywheel increases the cost of the flywheel and also of the detecting means associated therewith. Other electronic control devices have already been proposed, but they suffer from the inconveniences of one or both of the above mentioned devices (misadjustment or complexity).

It is the essential object of the device according to this invention to provide the same function, that is, calculating the value of the ignition advance angle and to control the occurrence of the ignition spark at a predetermined time, without the above mentioned inconveniences, therefore with a maximum reliability and a high degree of reproducibility of the setting, while using simple and therefore economical means.

The ignition electronic control device according to this invention, comprising a rotary member driven at engine speed and carrying at least two reference marks on which the particular positions correspond to the maximum ignition advance angle and to the minimum ignition advance angle in order to determine at least one area on said rotary member, a sensor located in the vicinity of said rotary member so as to detect the moments when said reference mark move past, and at least one up-and-down pulse counter, is characterised in that said rotary member comprises a third reference mark 14 separate from the first pair of reference marks 12, 13, so as to define two successive areas (A = 12, 13; B = 13, 14) scanned in succession by said sensor 4 and that a first up-and-down counter 22 positively counts the pulses of a first clock system 19, 20 during the passage of the first area A and negatively counts during the passage of the second area B, the pulses of another clock system 19, 27 emitting pulses at a frequency adapted to be programmed according to the desired ignition advance law, the resetting of said up-and-down counter being utilized for producing the ignition spark.

According to a preferred form of embodiment, for a four-cylinder, four-stroke engine, the device according to this invention comprises means for detecting six references marks on the engine flywheel which are divided into two series of three, the two series being identical due to the symmetrical engine operation. These three reference marks determine two areas on the engine flywheel, namely a first area for measuring the instantaneous velocity and a second area constituting the spark release area.

An up-and-down counter is charged by a clock during the passage of the first area and discharged by another clock during the passage of the second area. The ratio of the two clock frequencies, as will be explained presently, may be selected as a function of the ignition advance angle and in such a manner that the passage through zero of the negative counter corresponds to the ignition time. The last reference marks permits the release of the ignition spark in case of failure of the system in order to ensure an emergency or breakdown operation and to reset the assembly for another determination.

From the foregoing it is clear that this first system affords a satisfactory reliability and a proper reproducibility since the reference marks provided for controlling the spark are carried by the engine flywheel. On the other hand, the relatively small number of reference marks on the flywheel corresponds to a reasonable cost of the device.

Another section of the device according to this invention is designed for calculating by itself the ignition advance angle. To obtain optimum performances, this calculation must be such as to generate advance angles $\alpha$ consistent with a system of curves as illustrated in FIG. 1 of the attached drawings, i.e. of which the variations are linked to the engine velocity V and to the pressure P in the induction manifold. This system of curve is a synthesis of the various ignition advance laws that can be encountered in the case of a standard engine. The law linking the ignition advance to the vacuum prevailing in the induction manifold may be constant, increasing, decreasing, or alternating, and its pattern may change when the engine velocity varies. Practical experiments proved that when this law has a breaking point, its abscissa $Po$ is the same for all engine speeds. On the other hand, both the value of the advance angle for $P = Po$ and the various gradients are any functions of velocity. All these remarks explain the trend of the curves of FIG. 1. As a rule, the construction of this system of curves requires the use of a complex calculation unit if the parameters are measured in a conventional way. The second portion of this invention relates to a measuring and calculation unit capable of solving this problem in a particularly simple manner.

From the system or network of curves of FIG. 1, it is apparent that the value of the advance angle may be divided into two partial values. The first partial value is linked to the velocity referred to hereinafter as $a(w)$ and the second partial value linked both to the velocity and to the pressure may be expressed as the product of $(P-Po)$ by a term $b(w)$ denoting the gradient of the straight lines, this gradient varying as a function of the velocity and of the (positive or negative) sign of $(P-Po)$. The correction for temperature is limited as a rule to the increment of the advance angle value below predetermined temperatures. The device according to this invention is further characterised in that it comprises a pressure sensing member adapted to generate both the sign and the absolute value of $P-Po$), and an elementary calculation device performing the complementary operations. This calculation device comprises a memory for determining the velocity functions and a discrete binary multiplier for giving the necessary product. Finally, an up-and-down counter calculates the final value of the advance angle. With this device it is possible to provide the desired function without resorting to complex calculating or computing units, therefore at a cost materially lower than that of hitherto known devices.

This invention will be better understood as the following description proceeds with reference to the attached drawings illustrating diagrammatically by way of example, not of limitation, a typical form of embodiment thereof. In the drawings:

FIG. 9 illustrates a typical form of embodiment of the pressure sensor and of the treatment member controlled thereby.

Figure 2:
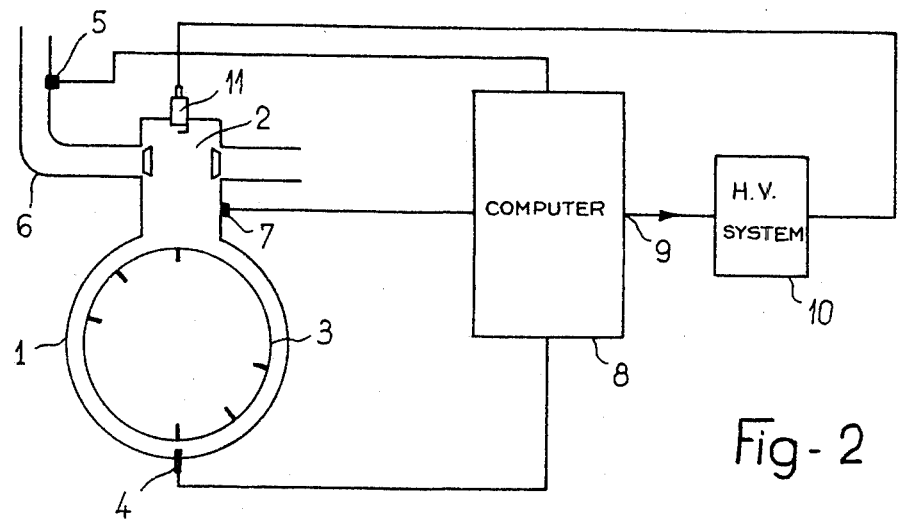
FIG. 2 illustrates in block diagram form the device according to this invention.

Referring to FIG. 2 of the drawings, there is illustrated therein a general or block diagram of the device of this invention, which is associated with an internal combustion engine 1 comprising a combustion chamber 2 and a flywheel 3. Three data are measured: the passages of reference marks on the flywheel 3 are detected by a position sensor 4; the pressure in the induction manifold is measured by another sensor 5, and the engine temperature is measured by a temperature sensor 7. These three data are fed to a computer 8 adapted to deliver at its output 9 a pulse for controlling a high-voltage system 10 for operating a sparking plug 11.

Figure 3:
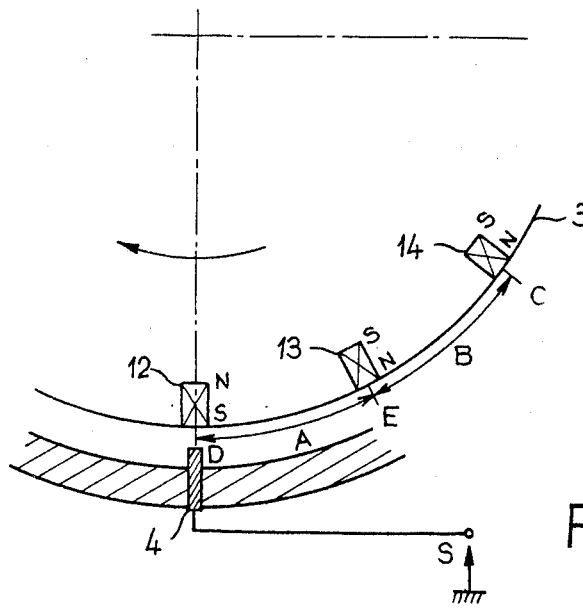
FIG. 3 shows a detail of the sensor means for detecting the position of the engine flywheel.
Figure 4:
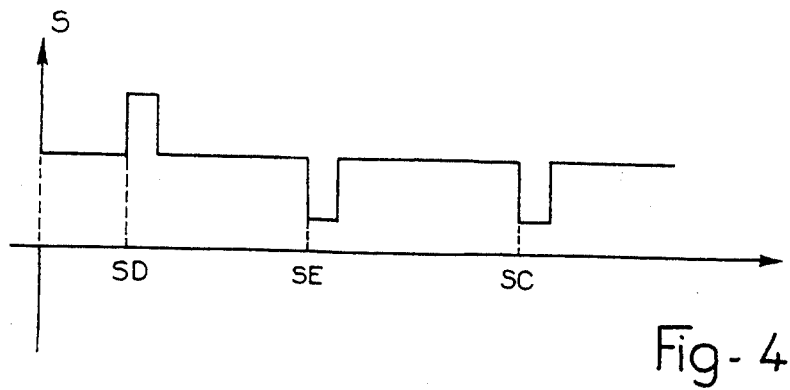
FIG. 4 illustrates the signal received from this sensor.

FIG. 3 illustrates the details of the system for detecting the position of the engine flywheel 3. The sensor 4 operating according to a method based on the magnetic-field detecting effect delivers a pulse each time one of the magnets fitted in notches 12, 13 and 14 moves past said sentor 4. The magnets are so disposed that the polarity of the magnet in notch 12 is opposite that obtaining in notches 13 and 14. The pulses received at the output S of sensor 4 are illustrated in the diagram of FIG. 4; thus, these pulses are positive for example for notch 12 and negative for notches 13 and 14. The position of these notches on the flywheel is such that the area A (FIG. 3) corresponds to a predetermined number X of degrees on the flywheel. Point E designates the maximum possible value of the advance angle, and point C its minimum value. It may be seen that another set of three identical notches is disposed diametrally opposite this set on the flywheel for providing the necessary two ignitions per revolution for a four-cylinder, four-stroke engine. This sensor, providing the three pulses denoted SD, SE and SC (FIG. 4) in connection with the generating notches illustrated in FIG. 3, in which the pulse SD differs from the other pulses, may be constructed in a different manner without departing from the basic principle of the invention. Similarly, it is also possible to use a sensor capable of detecting the three reference marks 12, 13 and 14 without detecting the difference between these marks, this detection being achieved by a second sensor.

Figure 5:
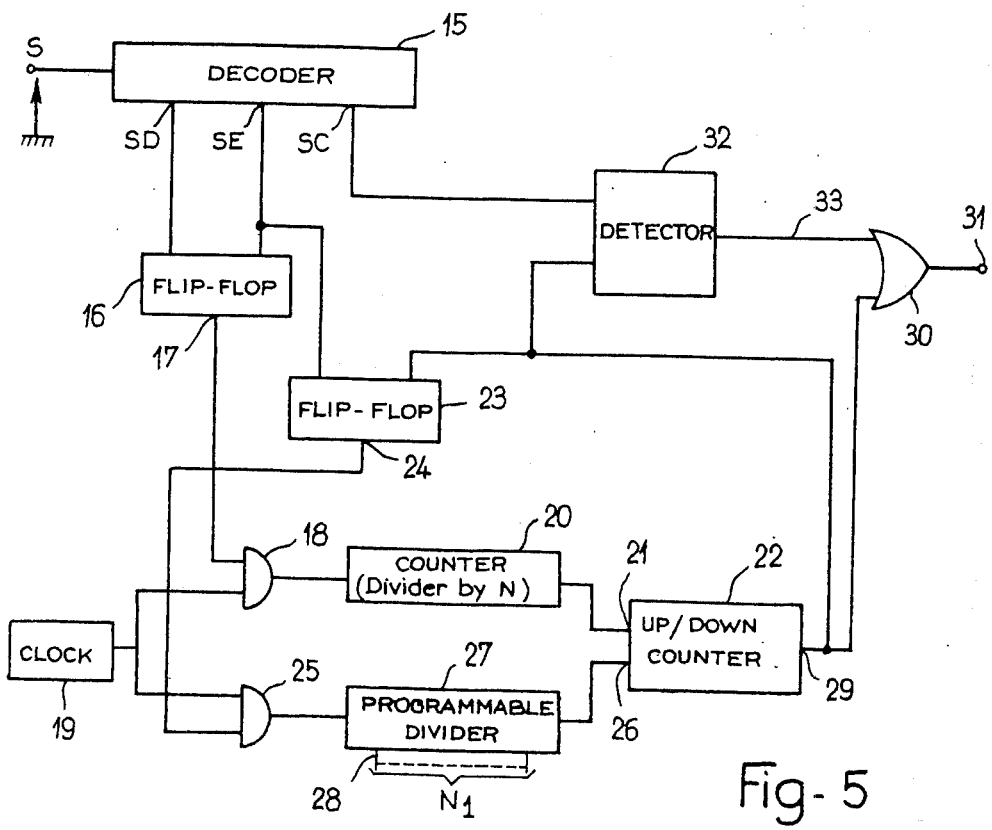
FIG. 5 illustrates in block form the ignition release member.

FIG. 5 illustrates the device contemplated for releasing the ignition pulse. The signal S is fed to the input of a decoder 15 for separating the three signals SD, SE and SC and delivering them from three different outputs. Signals SD and SE are fed to a flip-flop univibrator 16 adapted to open a gate 18 with its output 17 in the gap separating the two signals. Thus, the signal delivered by a clock 19 and subsequently divided in a counter 20 operating as a divided by N can be fed to the counting input 21 of an up-and-down counter 22.

As the signal SE appears, the signal at 21 disappears and a flip-flop univibrator 23 opens by means of its output 24 a gate 25 allowing the clock signal to be fed to the input of the aforesaid up-and-down counter 22 after having been divided in a preselection counter 27 operating as a programmable divider. This counter 27 has programmation inputs 28 receiving in binary form a number N1 proportional to the advance angle and delivered by an ignition advance angle computer illustrated in FIG. 6; in other words, the division of factor of counter 27 is the complement between N1 and its counting capacity. When the up-and-down counter 22 clears its zero position, its output 29 emits a pulse restoring the flip-flop univibrator 23, thus closing the gate 25 and, via an OR gate 30 and its output 31, operates the high-voltage device 10 (FIG. 2) producing the ignition spark. In other words, the mode of operation of the device may be so selected that the variable ratio of the division factors of counters 27 and 20 determines the value of the angle fraction of area A which follows the point E when the ignition is produced, and the higher N1, the lower this value.

A safety device consists of a trigger 32 delivering at its output 33 a pulse transmitted to output 31 via said OR gate 30. This detector 32 generates a pulse when the signal SC appears before the output signal from downcounter 22, i.e. the spark signal. In fact, in this specific case, the spark is issued from area B (FIG. 3) in which it should normally be generated. Therefore, the apparatus made an erroneous determination and the spark must occur at SC for operating the engine. This device actually consists of an automatic emergency means for the computing system. Finally, the signal SC resets all the counters of the device to enable same to receive the next signal SD, but this has not been illustrated in the drawings for the sake of clarity.

Figure 6:
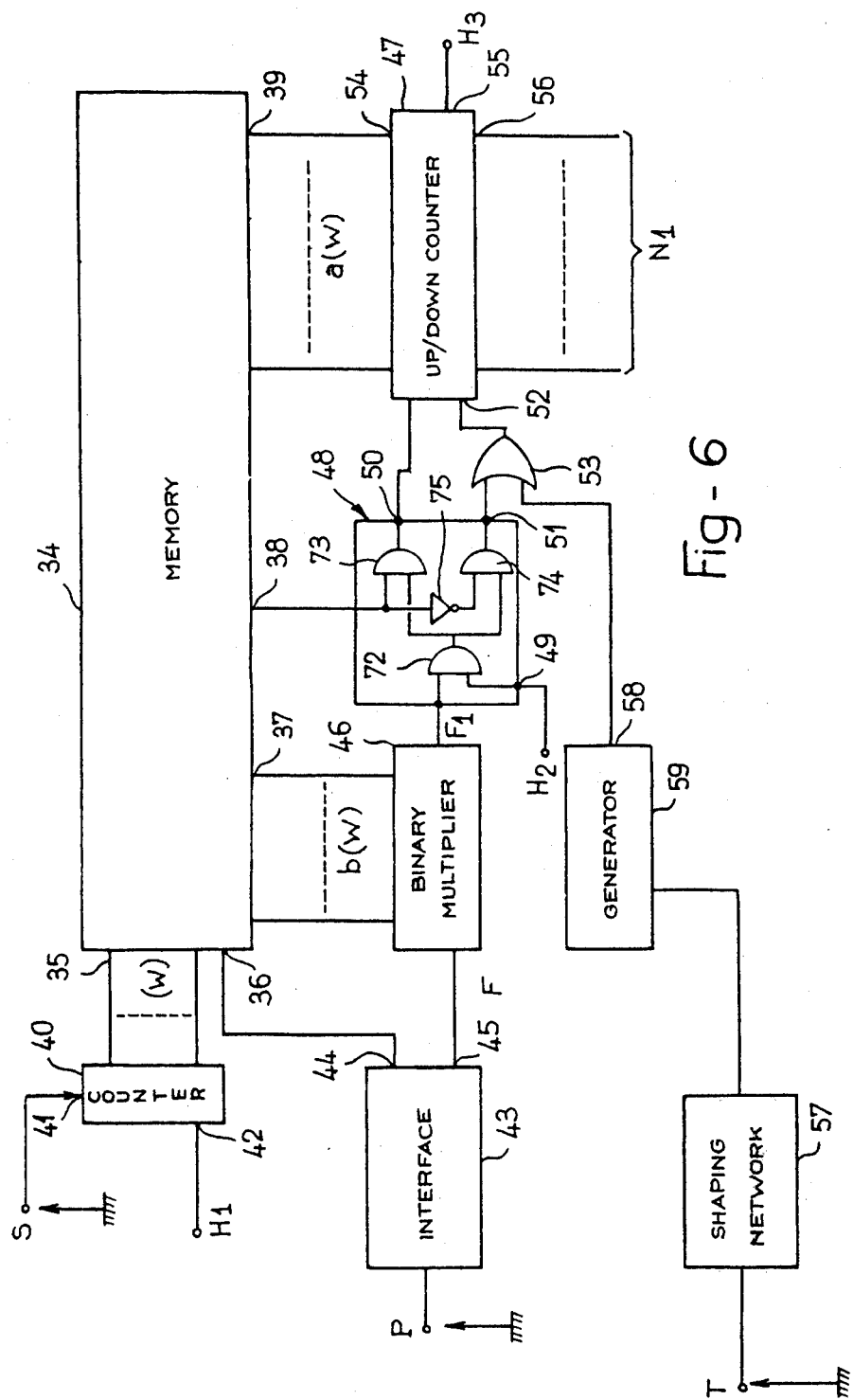
FIG. 6 illustrates the computing unit also in block form.

The computing unit illustrated in FIG. 6, which generates a value of N1 proportional to the advance angle, comprises a memory unit 34 consisting either of a so-called "dead" memory or of a programmable logic unit, or any decoder capable of performing the desired function. This device has two inputs 35 and 36 to which digit signals are fed, and outputs 37, 38 and 39 where likewise digit signals appear, thus causing the value of the output signals to be linked to that of the input signals by a program pre-recorded in the memory unit 34.

Connected to the inputs 35 are the outputs of a counter 40 receiving in turn at its counting input 41 the signal S. This counter 40 operates during a fixed time period determined by a signal H1 fed to input 42. The signal H1 is delivered by an internal clock of the system of which a typical example will be described presently with reference to FIG. 8. The counter outputs will thus transmit a number proportional to the engine velocity, and the numbers delivered by the memory unit 34 are proportional to the engine speed. It may be seen that an alternate solution consists in feeding the signal S to the initializing input 42 and then to count the pulses from a fixed clock during a time equal to the period of rotation, whereby the output signal will be proportional to the inverse of the engine velocity. The choice between these two solutions is dictated by a compromise between accuracy and rapidity.

The signal P from the pressure sensor 5 (FIG. 2) is fed to an interface element 43 to be described presently in detail. This interface comprises two outputs 44 and 45. The output 45 delivers a signal F having a frequency proportional to the absolute value of (P−Po) wherein P designates the pressure in the induction manifold 6 (FIG. 2) and Po a fixed value of said pressure, which appears in FIG. 1. The output 44 is a signal denoting the sign of (P−Po) which is fed to the input 36 of memory unit 34.

The outputs of this memory unit 34 are connected as follows: the output 37 transmitting a binary number denoted $b(w)$ which is a function of velocity or the inverse thereof, according to the specific case involved, is connected to the input of a discrete multiplier 46 delivering at its output a signal F1 and receiving at another input the signal F having a frequency proportion to (P−Po), as explained hereinabove. The signals are such that the frequency of signal F1 corresponds to the relationship:

$$F1 = F \times b(w)$$

wherein all the terms are now known. The signal F1 is fed through a gate 48 during a predetermined time to one input of an up-and-down counter 47. The function of gate 48 is to select the input of the down-counter to which the signal F1 is to be fed according to the value (0 or 1) of the signal available at the output 38 of the memory unit 34 and representative of the sign of $b(w)$, and also to determine the time during which said signal F1 will be fed by virtue of its input 49 receiving the signal H2 from the internal clock of the system illustrated in FIG. 8. The aforesaid gate 48 will thus comprise an AND circuit 72 receiving at its inputs the signals F1 and H2, the output of this circuit being connected to one of the inputs of each one of a pair of AND circuits 73 and 74 having their outputs arranged to form a gate at 50 and 51. At the second input of said AND circuit 73 the signal 0 or 1 of said output 38 is fed, the same signal being inverted in a NO circuit 75 before being also fed to the second input of said AND circuit 74. Therefore, according to the value of the signal obtaining at said output 38 the signal F1 is switched towards the output 50 or output 51 of said gate, provided that the signal H2 be present for permitting this passage. If signal F1 is present at output 50 of gate 48, it is fed directly to the down-counting input of said up-and-down counter 47. In the other alternative, it is present at output 51 of said gate and fed to the up-counting input 52 of up-and-down counter 47 via an OR gate 53.

Figure 8:
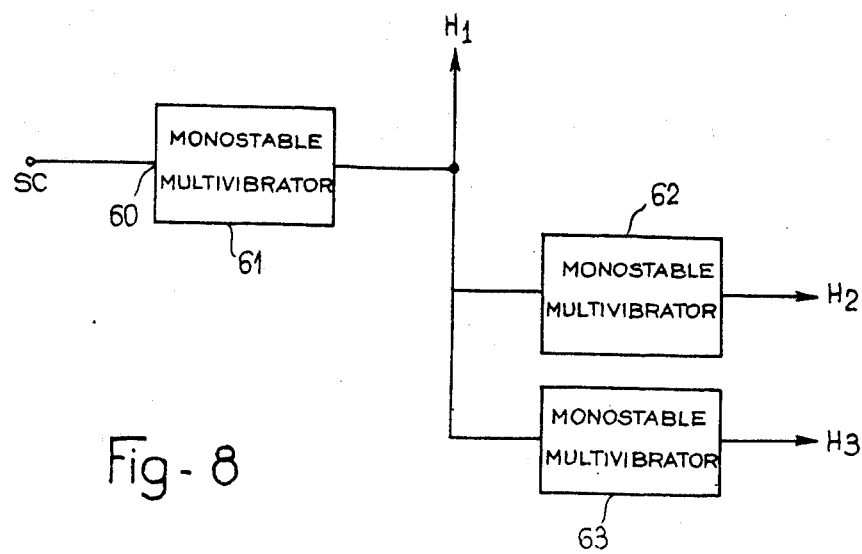
FIG. 8 illustrates the base clock of the computer.

The up-and-down counter 47, in addition to the above-mentioned up- and down-counting inputs, receives at its pre-section or predetermination inputs 54 the aforesaid number $a(w)$ from ouputs 39 of the memory unit. This number, like $b(w)$, is proportional to the engine velocity or to the inverse thereof, according to cases. When the signal H3 from the clock of FIG. 8 is fed to the loading input 55 of said up-and-down counter 47, the number $a(w)$ is entered into this up-and-down counter. Any pulse fed to the up-and-down counting inputs is thus added to or substracted from this number, to display at the outputs 56 the value of N1, which is the result of the calculation.

The signal T from the temperature sensor 7 (FIG. 2) is shaped in a shaping network 57 and causes pulses to be emitted at the output 58 of a generator 58 of a generator 59 at predetermined temperature values. These pulses are fed through the OR gate 53 to the input of said up-and-down counter 47.

Figure 1:
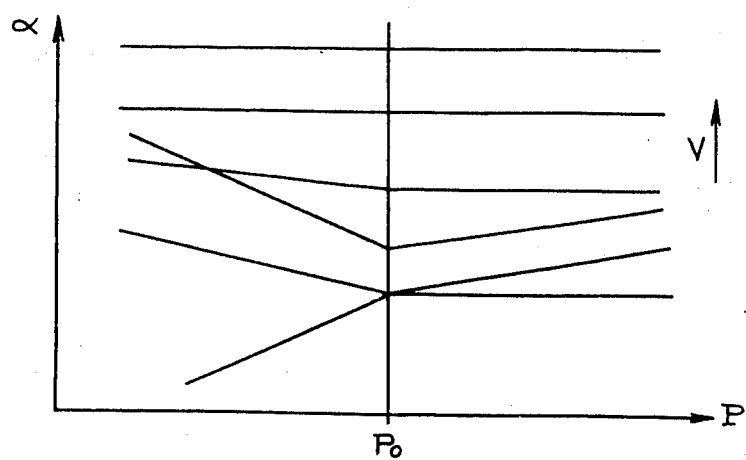
FIG. 1 is a system of curves showing the value of the ignition advance angle α as a function of the induction pressure P and the engine velocity V.

Preliminary to the description of the mode of operation of the device of this invention, reference must be made again to the calculation relationship given in the preamble of the description with reference to FIG. 1. In fact, the general relationship required for reproducing the set of curves of FIG. 1 has the form:

$$\alpha = a(w) + b(w) \cdot (P-Po)$$

in which
 $\alpha$ is the value of the advance angle,
 $a(w)$ is a constant of which the value depends on $w$ (engine velocity),
 $b(w)$ is the gradient of the straight lines of the diagram, its value being subordinate to both the engine speed ($w$) and the sign of (P−Po),
 P is the value of the pressure in the engine induction manifold, and
 Po is the specific value of this pressure which appears in the diagram of FIG. 1.

Figure 7:
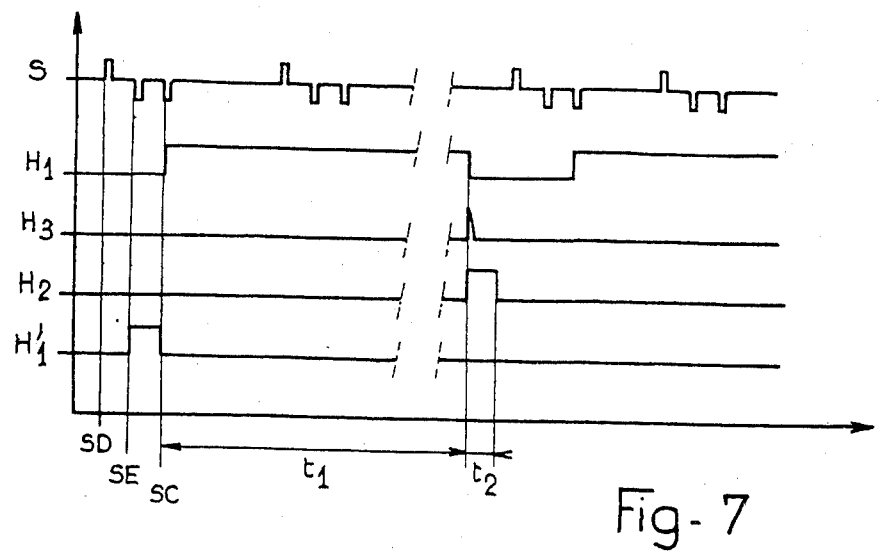
FIG. 7 illustrates the time diagram of the calculation.

The memory unit 34 contains the above-defined values $a(w)$ and $b(w)$. Its input 35 receives the value of the velocity or its inverse value, these two solutions differing from each other for the values of $a(w)$ and $b(w)$ only by the internal coding of the memory unit 34. The other input 36 receives the sign of (P−Po) as explained in the foregoing. It is thus clear that the values available at 37, 38 and 39 may be respectively the value of $b(w)$, the sign of $b(w)$ which is positive under all circumstances. For making a calculation, the up-and-down counter 47 is charged with $a(w)$, then a number of pulses proportional on the one hand to the product (P−Po)· $b(w)$ generated by the discrete binary multiplier 46 and on the other hand to the temperature via generator 59, is added or deducted. The number N1 obtained at the end of the cycle at the output of the up-and-down counter 37 is actually the desired result. The sync signals mentioned in the specification and reproduced in the diagram of FIG. 7 are generated by the basic clock of the system, which is illustrated in FIG. 8. In this Figure, as well as in FIG. 7, it will be seen after the spark has been struck (which, as already explained, took place between SE and SC), the signal SC causes through its ascending front the signal H1 to appear, this signal H1 having a duration $t1$ and causing in turn the release of two signals H2 and H3, signal H2 having a duration $t2$ and signal H3 an extremely short duration compared with $t2$.

The time $t1$ is the time necessary for counting the velocity information, and the time $t2$ is the time necessary for counting the product $b(w) \cdot (P-Po)$. A typical clock construction is illustrated in FIG. 8. The signal SC is fed to the input 60 of a monostable multivibrator 61 generating at its output a signal H1. This signal H1 is fed in turn to another pair of monostable multivibrators 62 and 63 at their inputs responsive to the descending or trailing end of the pulses. These various monostable multivibrators generate the requisite signals H2 and H3. If the counter 40 has at its output the inverse of the velocity value, the time $t1$ is eliminated and consequently the monostable multivibrator 61 is also eliminated. The signal SC operates or triggers the monostable multivibrators 62 and 63. Thus, signal H1 is replaced by a signal H'1 equal to the time elapsing between SE and SC (see FIG. 7) produced in a known manner by means of a flip-flop, this signal is in fact proportional to the inverse of the rotational velocity of the engine, in order to yield the desired function.

FIG. 9 illustrates one of the possible forms of embodiment of the pressure sensor and of the interface required for obtaining the characteristic features of the device of this invention.

The pressure sensor 5 illustrated comprises a case of rigid metal divided into two chambers by a diaphragm 64. One chamber communicates with the indication manifold or pipe 6 of the engine, and the other chamber is vacuumized. Therefore, the diaphragm position is subordinate to the absolute pressure P prevailing in the induction manifold. This diaphragm has its central portion rigidly connected to the movable core or plate 65 of a capacitor having its fixed sheath or plate 66 so disposed that the maximum capacity value C of the capacitor be obtained when $P = Po$. On either side of this value, the capacity decreases. The capacitor thus constructed controls the operation of an oscillator 67 disposed in the above-defined interface 43. With this arrangement, the oscillator 67 is adapted to deliver at its output 45 a signal F having a frequency proportional to the absolute value of $(P - Po)$. On the other hand, an optical-electronic device consisting of an emitter 68 and a receiver 69 is adapted to determine the position of the movable element 65 of the capacitor. When this movable element 65 has moved beyond the point of maximum capacity (that is, when this element 65 is retracted completely within the sheath 66), the path of the light beam 70 is free of any obstacle and the amplifier 71 receives a signal which is thus amplified and delivered at its output 44. This signal is therefore the equivalent of the sign of said quantity $(P - Po)$.

Now, it will readily occur to those conversant with the art that this specific form of embodiment is given by way of example only, for many other solutions may be brought to this problem for obtaining the same result, from the dual point of view of the method of measuring the negative pressure and of the method of measuring the collected information in the form of electric signals.

Besides, although a specific form of embodiment of this invention has been described hereinabove and illustrated in the accompanying drawings, it will readily occur to those skilled in the art that various modifications and changes may be brought thereto without departing from the scope of the invention as set forth in the appended claims.

What is claimed as new is:

1. an electronic ignition control system for an internal combustion engine comprising a rotary member means for revolving at the engine velocity, two successive reference marks positioned on said rotary member means, a sensor means disposed in close vicinity of said rotary member means for producing successively a first and second signal at the moment of passage of said two reference marks, a decoder means, means for connecting said sensor means to said decoder means, said decoder means provided for separating respectively on a first and second output, said first and second signal, an up-and-down counter, a first clock means for producing pulses which are gated for positive counting to said up-and-down counter during the time separating said first and second signals, a second clock means for producing pulses which are gated for negative counting to said up-and-down counter in response to said second signal, said first and second clock means having a common clock and said second clock means including a preselection counter operable as a programmable divider comprising programmation inputs, an ignition advance angle computing means for generating a number representative of a desired ignition advance law characteristics, means for applying said number to said programmation inputs, means for re-setting said up-and-down counter, and generating means responsive to the resetting of said up-and-down counter for interrupting said negative counting and for generating an ignition signal, wherein said rotary member means includes a third successive reference mark, said sensor means including means for producing a third signal at the moment of passage of said third reference mark, said decoder means including means for separating on a third output said third signal, said generating means for generating an ignition signal including an OR gate having a first input responsive to said resetting of said up-and-down counter and a second input which is operatively connected to the third output of said decoder so that said OR gate generates an ignition signal in case of failure of the signal applied to its first input.

2. An electronic ignition control system according to claim 1 wherein said reference marks include permanent magnets, the polarity of one reference mark opposite to that of the other two reference marks for detecting the order in which said reference marks move past said sensor means.

3. An electronic ignition control system for an internal combustion engine comprising a rotary member means for revolving at the engine velocity, two successive referenc marks positioned on said rotary member means, a sensor means disposed in close vicinity of said rotary member means for producing successively a first and second signal at the moment of passage of said two reference marks, a decoder means, means for connecting said sensor means to said decoder means, said decoder means provided for separating respectively on a first and second output, said first and second signal, and up-and-down counter, a first clock means for producing pulses which are gated for positive counting to said up-and-down counter during the time separating said first and second signals, a second clock means for producing pulses which are gated for negative counting to said up-and-down counter in response to said second signal, said first and second clock means having a common clock and said second clock means including a preselection counter operable as a programmable divider comprising programmation inputs, an ignition advance angle computing means for generating a number representative of a desired ignition advance law characteristic, means for applying said number to said programmation inputs, means for re-setting said up-and-down counter, and generating means responsive to the resetting of said up-and-down counter for interrupting said negative counting and for generating an ignition signal, wherein each of said first and second clock means comprises and AND gate having an input connected to said common clock, the AND gate of said first clock means having a second input connected to the output of a first flip-flop, the two inputs of said flip-flop respectively connected to the first and second outputs of said decoder means, the AND gate of said second clock means having a second input connected to the output of a second flip-flop, the two inputs of said second flip-flop respectively connected to the second output of said decoder means and to said up-and-down counter so as to be reponsive to the resetting of said up-and-down counter.

4. An electronic ignition control system for an internal combustion engine comprising a rotary member means for revolving at the engine velocity, two successive reference marks positioned on said rotary member means, a sensor means disposed in close vicinity of said rotary member means for producing successively a first and second signal at the moment of passage of said two reference marks, a decoder means, means for connecting said sensor means to said decoder means, said decoder means provided for separating respectively on a first and second output, said first and second signal, an up-and-down counter, a first clock means for producing pulses which are gated for positive counting to said up-and-down counter during the time separating said first and second signals, a second clock means for producing pulses which are gated for negative counting to said up-and-down counter in response to said second signal, said first and second clock means having a common clock and said second clock means including a preselection counter operable as a programmable divider comprising programmation inputs, an ignition advance angle computing means for generating a number representative of a desired ignition advance law characteristic, means for applying said number to said programmation inputs, means for re-setting said up-and-down counter, and generating means responsive to the resetting of said up-and-down counter for interrupting said negative counting and for generating an ignition signal, wherein said ignition advance angle computing means comprises a memory means having inputs and a plurality of outputs for producing digital output signals, said memory means including a pre-recorded program for processing input signals applied to said inputs, wherein said digital output signals are linked to said input signals, a counter, an activation signal generator, means for connecting said activation signal generator to said counter, said sensor means connected to said counter, wherein the counter output signals are related to the engine speed, and means for applying said counter output signals to the inputs of said memory, a vacuum pressure sensor means for sensing the pressure in the induction manifold of the engine, an interface means connected to said vacuum pressure sensor means for producing separately a first signal having a frequency proportional to the absolute value of $(P-Po)$, wherein P is the pressure measured in the induction manifold and $Po$ a predetermined intermediate value of the pressure range in the induction manifold, and a second signal representing the sign of $(P-Po)$, said second signal applied to said memory, a discrete multiplier having one input connected to said interface means to receive said first signal emitted by said interface means and additional inputs connected to a group of outputs of said memory, said outputs of said memory delivering digital signals depending on the engine speed, a gate connected to the output of said multiplier and connected to a further output of said memory, said further output of said memory delivering digital signals depending on the engine speed, a gate connected to the output of said multiplier and connected to a further output of said memory, said further output of said memory representative of the sign of $(P-Po)$, said gate having two gate outputs and means for activating said gate outputs according to the sign of $(P-Po)$, an up-and-down preselection counter means comprising predetermination inputs and means for connecting said predetermination inputs to a corresponding group of outputs of said memory, said corresponding group of outputs of said memory delivering digital signals in relation to the engine speed, up-counting and down-counting inputs, and means for connecting said up-counting and down-counting inputs to respective outputs of said gate, and outputs of said preselection counter means defining said number representative of the desired ignition advance law and connected to the programmation inputs of said preselection counter operable as a programmable divider, and further activation signal generators for periodically activating said gate and the loading of the up-and-down preselection counter means, to produce said number representative of the desired ignition advance law.

5. An electronic ignition control system according to claim 4, further comprising an engine temperature sensor means, a pulse generator connected to said temperature sensor means for producing output pulses in relation to the engine temperature, and an OR gate interposed between the up-counting input of said up-and-down preselection counter means and the corresponding output of said gate, said OR gate having an input connected to the output of said pulse generator.

6. An electric ignition control system according to claim 5, wherein said vacuum pressure sensor means comprises a diaphragm responsive to said pressure, a variable capacitor having a movable core, said movable core connected to said diaphragm, wherein the maximum capacity value for said variable capacitor occurs for $P = Po$, and a decreasing capacity on either side of this value, said variable capacitor comprising means for cooperating with an oscillator to produce said first signal having a frequency proportional to $(P - Po)$, and said movable core cooperating with an optical-electronic means for sensing the position of said movable core for determining the sign of $(P - Po)$.

* * * * *